United States Patent [19]

Cros et al.

[11] Patent Number: 5,010,186

[45] Date of Patent: Apr. 23, 1991

[54] ACID/HEAT MODIFIED POLYSACCHARIDE BIOPOLYMERS

[75] Inventors: Patrick Cros; Robert Pipon, both of Melle, France

[73] Assignee: Rhone-Poulenc Specialties Chimiques, Courbevoie, France

[21] Appl. No.: 372,819

[22] Filed: Sep. 13, 1989

Related U.S. Application Data

[62] Division of Ser. No. 896,282, Aug. 14, 1986, Pat. No. 4,873,323.

[30] Foreign Application Priority Data

Aug. 14, 1985 [FR] France ................................. 85 12382

[51] Int. Cl.$^5$ .................... C07G 17/001; C08B 37/00; E21B 43/22
[52] U.S. Cl. .................................... 536/114; 536/123; 536/124; 166/246; 435/104
[58] Field of Search ................... 514/54; 536/114, 123; 166/246; 435/104

[56] References Cited

U.S. PATENT DOCUMENTS

| | | | |
|---|---|---|---|
| 3,000,790 | 9/1961 | Jeanes et al. | 435/104 |
| 4,182,860 | 1/1980 | Naslund et al. | 536/114 |
| 4,214,912 | 7/1980 | Racciato et al. | 106/208 |
| 4,440,225 | 4/1984 | Holzwarth | 166/246 |
| 4,493,774 | 1/1985 | Bragg | 252/8.55 D |
| 4,667,026 | 5/1987 | Jarry et al. | 536/114 |

FOREIGN PATENT DOCUMENTS 2111520 7/1983 United Kingdom.

*Primary Examiner*—Douglas W. Robinson
*Assistant Examiner*—Jean C. Witz
*Attorney, Agent, or Firm*—Burns, Doane, Swecker & Mathis

[57] ABSTRACT

Novel deacetylated polysaccharide biopolymers having improved viscosity/filtrability/injectability, well adopted for the secondary and tertiary recovery of oil deposits, are conveniently prepared by (i) acidifying an aqueous polysaccharide composition, e.g., a carbohydrate fermentation broth, with nitric acid to a pH of from about 2 to 0.1, (ii) heat-treating said acidified composition at a temperature of from about 50° to 100° C. for from about 5 to 60 minutes, and (iii) cooling said heat-treated composition and adjusting the pH thereof to a value of from about 5 to 7.

10 Claims, 3 Drawing Sheets

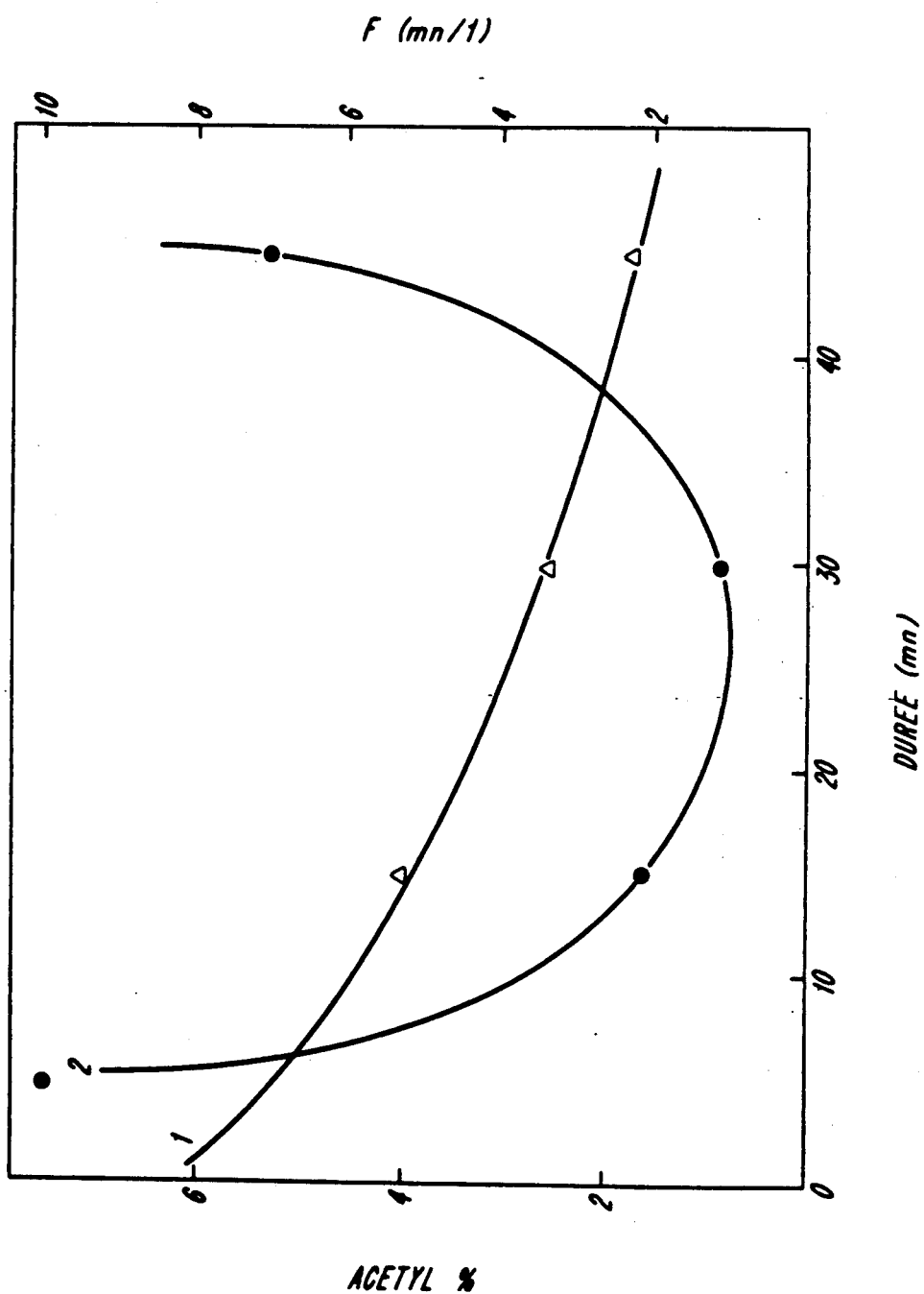

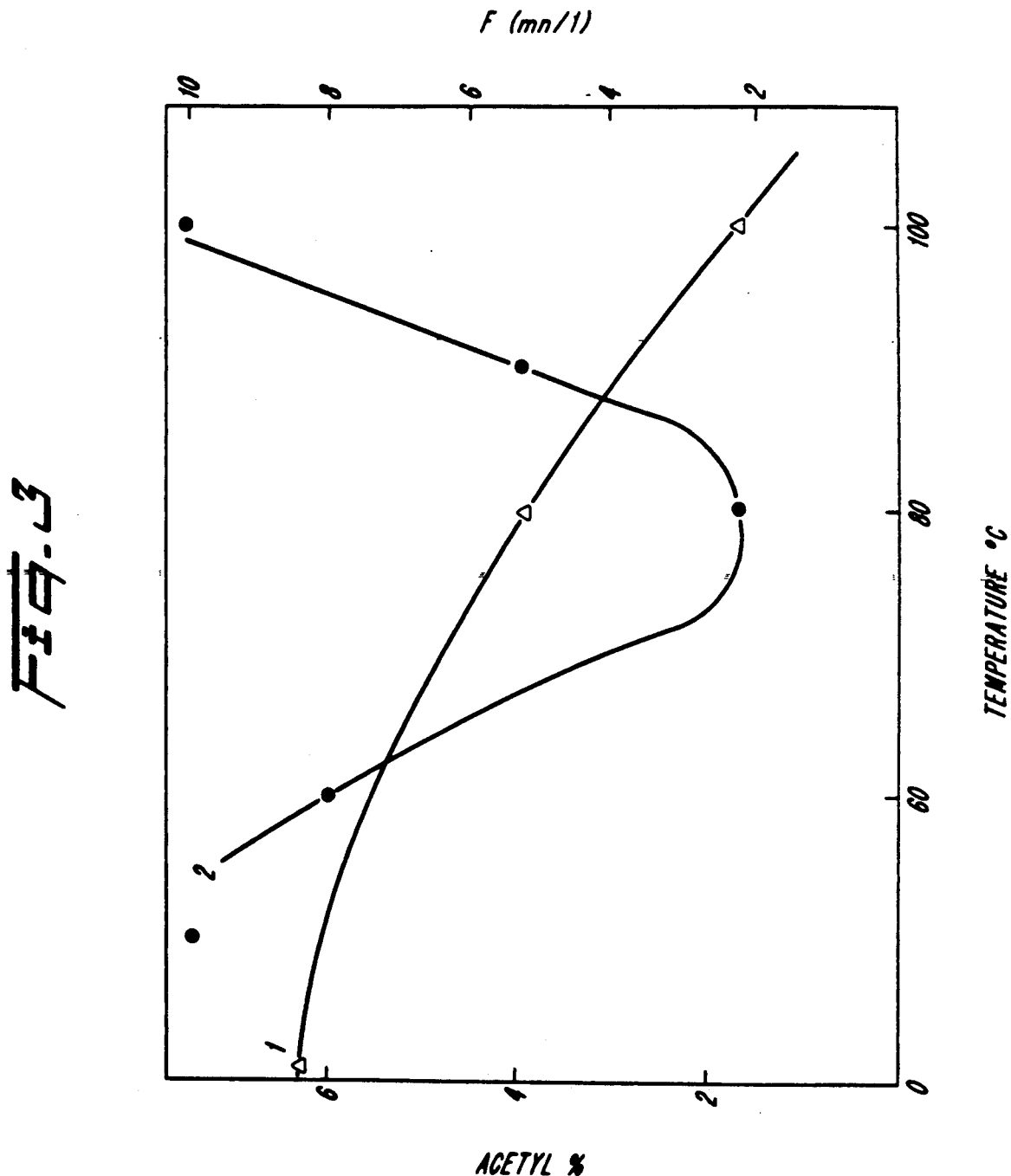

ACID/HEAT MODIFIED POLYSACCHARIDE BIOPOLYMERS

This application is a division of application Ser. No. 06/896,282, filed Aug. 14, 1986 now U.S. Pat. No. 4,873,323.

BACKGROUND OF THE INVENTION

1. Field of the Invention

The present invention relates to novel polysaccharide biopolymers and to the preparation of polysaccharides, notably Xanthan gum. The subject modified polysaccharides are especially useful in the enhanced oil recovery from partially depleted deposits.

2. Description of the Prior Art

The homo- and heteropolysaccharides, or biopolymers obtained from the fermentation of a carbohydrate by the action of bacteria of the genera *Xanthomonas* or *Arthrobacter*, or fungi belonging to the genus *Sclerotium*, are widely used on an industrial level due to their thickening and viscosity-enhanced properties.

One of the known applications of these polysaccharides of Xanthan gum type is in the secondary and tertiary recovery of oil. In this application, aqueous solutions diluted to a concentration of approximately 300 to 3,000 ppm are used to drive the oil from partially depleted reservoirs. In fact, Xanthan gum is characterized by high viscosity at low concentration, great insensitivity to salinity and to the nature of the salts, and great stability against mechanical stresses. However, solutions prepared from industrial grades, whether directly from the fermentation broth, or prepared by diluting the powder which is precipitated and separated from the broth, have the major disadvantage of rapidly clogging the pores of the rock formations into which they are injected, thus giving rise to undesirable increases in pressure and preventing any further rapid oil recovery. It is known to this art that such clogging originates (i) from the presence of insoluble particles such as cell debris and dead bacteria emanating from the fermentation on the one hand, and (ii) from a number of translucent molecular aggregate deemed microgels, especially if the solution is prepared utilizing a biopolymer which has been precipitated from the fermentation broth, on the other.

Several methods have been proposed to this art for improving the viscosity and/or the filtrability and injectability of such polysaccharide solutions, including heat treatments, addition of flocculants, enzymatic treatments, whether combined or otherwise with a filtration step, for example, filtration through diatomaceous earth or by means of ultrafiltration membranes.

The heat treatment may be carried out either in a neutral or alkaline medium as described in U.S. Pat. Nos. 3,555,447, 3,591,578, 3,729,460 and 4,182,860, or in an acid medium as described in published French Patent Application No. 2,551,070. The treatment at an acid pH under the conditions set forth in said French Patent Application No. 2,551,070 makes it possible to increase the viscosity of the solutions and to significantly improve their filtrability and their injectability. However, it has been determined that this improvement remains inadequate to permit their use as a fluid for injection into porous media having low permeability, e.g., a permeability of less than approximately 1 darcy.

Xanthan and similar heteropolysaccharides contain D-glucose, D-mannose units and glucuronic, pyruvic and acetyl radicals in proportions which vary depending upon the specific strain used and the conditions of fermentation.

It also is known to this art that alkaline treatment removes the acetylated groups. Such process of deacetylation has been described in U.S. Pat. No. 3,000,790 which indicates that deacetylated Xanthan enables the provision of viscous solutions which are less sensitive to mineral salts than the native Xanthan. U.S. Pat. No. 3,964,972 describes the preparation of modified heteropolysaccharides by treatment in an alkaline medium at a high temperature. According to this letter patent, the deacetylation takes place almost immediately and it is probable that hydrolysis and depolymerization are the predominant reaction mechanism.

The pyruvate groups of Xanthan have been removed by heat treatment in the presence of oxalic acid at pH=3 and the acetyl content has remained unchanged. [Carbohydr. Res., 76, 277-80 (1979)]. By the process described in U.S. Pat. No. 4,182,860, in a saline medium, physically and chemically modified polysaccharides are prepared which contain approximately 20% less pyruvate groups and approximately 10% less acetyl groups than the unmodified native polysaccharide, resulting in improved filtrability. However, the loss of the pyruvate groups may cause a modification of the rheological behavior of the final solutions.

SUMMARY OF THE INVENTION

A major object of the present invention is to provide for the increased filtrability and injectability of aqueous solutions of polysaccharides without deteriorating their viscosity-enhancing capability, thus permitting their injection into porous media of average and low permeability. Another object of this invention is to provide an economical process for the preparation of modified polysaccharides which can be used in a saline medium and injected into porous formations without clogging.

Briefly, the present invention features the preparation of a modified polysaccharide by heat treating an aqueous composition containing 0.05 to 35% by weight of polysaccharide and is characterized in that:

(a) the composition is acidified by adding nitric acid thereto until a pH of from 2 to 0.1 is obtained;

(b) the composition is next heated to a temperature of 50–100° C. for a period of time of from 5 to 60 minutes; and (c) the composition is then cooled and its pH is increased to a value of 5–7 adding a base thereto.

DETAILED DESCRIPTION OF THE PREFERRED EMBODIMENTS OF THE INVENTION

Figure 1:
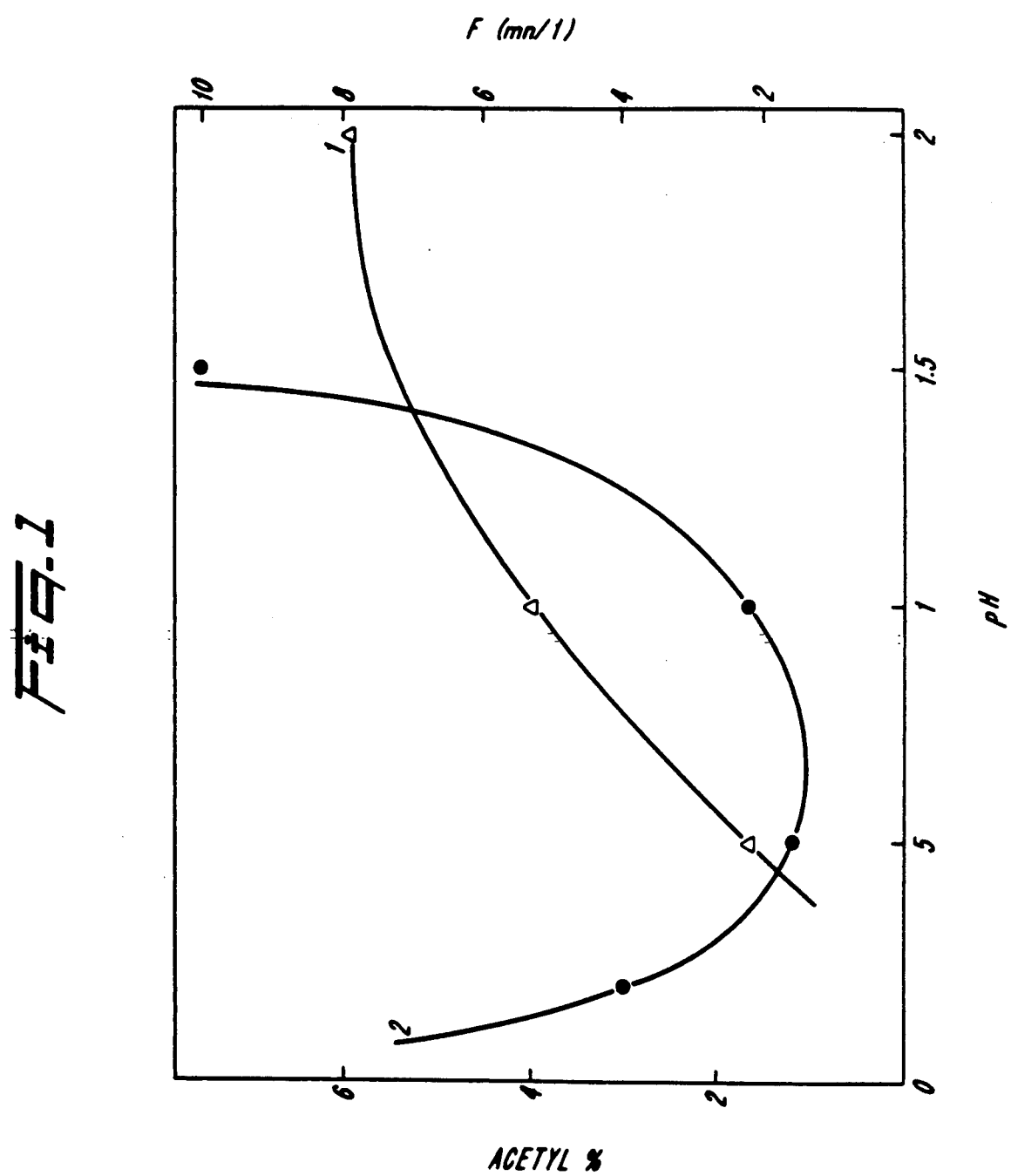

More particularly according to the present invention, the subject process is applicable to any high molecular weight homo- or heteropolysaccharide obtained by fermentation of a carbohydrate via the action of microorganisms. The Xanthan gum is synthesized utilizing bacteria which belong to the genus Xanthomonas, and, more advantageously, to the species described in Bergey's manual of determinative bacteriology (8th edition, 1974, Williams N. Wilkins Co., Baltimore) such as *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians, Xanthomonas pelargonii*. Among the other microorganisms which are capable of producing polysaccharides with similar properties, bacteria which belong: to the genus *Arthrobacter,* and more *Arthrobacter viscosus;* to the genus *Erwinia;* to the genus *Azotobacter,* and more advantageously the species *Azotobacter indicus;* to the genus *Agrobacterium,* and more advantageously, the species *agrobacterium radiobacter, Agrobacterium rhizogenes, Agrobacterium tumefaciens;* or fungi which belong to the genus *Sclerotium,* and more advantageously, to the species *Sclerotium glucanicum, Sclerotium rolfsii,* and the like, are representative.

Experience has shown that certain species are especially efficient in producing polysaccharides. The species *Xanthomonas campestris* is most particularly well suited for the synthesis of Xanthan gum.

A wide variety of carbohydrates may be fermented utilizing microorganisms of the aforesaid genera in order to produce the polysaccharide used in the process according to the invention. The carbohydrates which are suitable include glucose, saccharose, fructose, maltose, lactose and starch. The fermentation of the carbohydrate is typically carried out in an aqueous medium containing up to 100 g/l of carbohydrate. It is known that the fermentation medium may additionally contain a source of phosphorus, a source of magnesium which is an enzyme activator, and a source of nitrogen which may be organic, inorganic or mixed organic/inorganic in nature.

The preparation of Xanthan gum is described in numerous publications and numerous patents. Compare, for example, U.S. Pat. Nos. 3,020,206, 3,020,207, 3,391,060 and 4,154,654.

The biopolymer may be recovered from the broth by precipitation using a precipitating agent, for example, isopropanol, followed by filtration and drying.

The aqueous compositions containing the polysaccharide which are treated according to the process of the invention may be solutions obtained by dissolving commercial quality powder of the biopolymer. The dissolution may be carried out using demineralized water or tap water, with mineral salts added, if appropriate. In an advantageous and preferred embodiment for subsequent use in enhanced oil recovery, the process is applicable to the entirety of the fermentation broth.

The term "entirety of the fermentation broth" refers to aqueous solutions, as well as to emulsions, resulting from the fermentation process, containing cell debris, bacterial residues, mineral salts and other ingredients which are required for the fermentation, and also solutions which are diluted, concentrated and/or filtered in a manner known, per se. The compositions resulting from a process for the fermentation of an emulsion have been described in the published French Patent Application No. 84/19,622. Upon completion of the process of fermentation and polysaccharide production, the broth may normally contain approximately 10 to 50 g/liter of biopolymer and its pH advantageously ranges from approximately 6.5 to 7.5. The broth may be concentrated by known means until a solution containing up to approximately 350 g of biopolymer per kg of broth is obtained.

The biopolymer composition (entire broth or reconstituted solution) is acidified to a pH of from 0.1 to 2, preferably less than 1.5, in the presence of nitric acid. It is then heated to a temperature of from 50° to 100° C., preferably 60°-90° C., and maintained at this temperature for a period of from 5 minutes to 60 minutes, preferably from 10 to 45 minutes.

After the heat treatment, the solution is cooled and adjusted to a pH of 5-7 by adding a base such as NaOH, KOH, $NH_4OH$, etc. The residual insoluble material of fine particle size may subsequently be removed by centrifugation, or filtration through diatomaceous earths, cartridge filters or other means.

The biopolymer may be isolated from the solution or from the broth by conventional means, for example, precipitation using a lower alcohol, spray or drum drying. The solution or the broth may also be concentrated by conventional means such as evaporation or ultrafiltration.

A biocide or an enzyme may also be added to the heat-treated solution or to the precipitated powder, if required. In another embodiment, if the biocide is stable under the conditions of heating in the acid medium used, it may be added prior to the heat treatment stage.

The polysaccharides obtained by heat treatment in the presence of nitric acid according to the invention are chemically different from the unmodified native polysaccharides. The treatment results in a decrease in the number of acetyl groups compared to the native polysaccharide, but unexpectedly, the number of pyruvic groups remains unchanged. It has been determined that the decrease in acetyl groups relative to the native polysaccharide may be from 5 to 80% depending upon the conditions of pH, temperature and treatment period.

These modified polysaccharides have a filtration capacity such that at least 1,000 ml of an aqueous solution containing 1,000 ppm of polysaccharide and 11% of dissolved salts comprising NaCl and divalent chlorides, in a ratio of 5:1, pass through a 1.2 $\mu$m pore diameter Gelman Versapor ® filter of 47 mm diameter in less than 10 minutes without clogging, under a constant pressure of 3 bars, after prefiltration through a 5 $\mu$m pore diameter MF-Millipore ® filter.

The fermentation broths and the aqueous solutions containing the polysaccharides modified by the process of the invention, as well as the powders isolated from these solutions, can be used in all applications for Xanthan gum, and, more particularly, in applications requiring clarified products. The high filtration performance combined with the high viscosity-enhancing capability makes them particularly suitable for use in the petroleum industry, and more specifically, as an additive for controlling the mobility of aqueous fluids during an enhanced oil recovery operation which consists of injecting the said aqueous fluid containing the polysaccharide into an underground oil-bearing formation through an injection well, in order to drive the oil from the formation to a production well.

In order to further illustrate the present invention and the advantages thereof, the following specific examples are given, it being understood that same are intended only as illustrative and in nowise limitative.

In said Examples 1 to 6, the entirety of the fermentation broths of the Xanthan gum produced by *Xanthomonas campestris* were used.

EXAMPLE 1

Nitric acid (58% w/w)) was added to a plurality of vessels, each containing 10 kg of broth (solutions containing 22 g of isopropanol precipitable dry matter per kg of broth), in an amount sufficient to lower than pH to a value of from 0.2 to 2, as indicated in Table I. The broth was preheated for one minute by circulating it in a coil immersed in an oil bath to bring it to the treatment temperature. It was then maintained at a temperature of 80° C. for 15 minutes in a thermostat-controlled chamber. The solutions were then cooled to ambient temperature and the pH was adjusted to 5.0 by adding 30% strength sodium hydroxide.

From an aliquot fraction of each solution, the polysaccharide was isolated by precipitation with isopropanol and dried. The glucuronic, acetic and pyruvic group contents of the xanthan molecule were determined.

The glucuronic acetic groups were determined by gas-phase chromatography. The pyruvic groups were determined by the method described in Cody's *Food Chemicals*, 3rd Edition, "Xanthan gum".

On each remaining solution, the filtrability was measured using a test which stimulated the behavior of solutions in a porous medium.

During the injection of a diluted polysaccharide broth into a porous underground oil formation, the undeformable cell debris were stocked at the initial layers of the medium traversed. The shear rate then being significant, the microgels and fine particles may pass through the pores. At longer distances of the injection well, the shear rate being lower, these particles may clog the medium at depth. For evaluating the filtrability under these two conditions, a first filtration was carried out through a 5 μm filter which simulated the injectability of the solution into the first layers of rock, followed by a second filtration through a 1.2 μm filter which simulated the behavior of the xanthan molecule deep within the rock formation.

Filtrability Test

Each solution was diluted with a brine such as to provide a final solution containing 1,000 ppm by weight of xanthan, having a salt concentration of 11% (NaCl-divalent chloride-ratio of 5:1). The viscosity of the 1,000 ppm solution was measured (V1). This solution was filtered through a 5 μm pore diameter MF-Millipore ® filter of 47 mm diameter under a pressure of 3 bars. The viscosity of the filtrate was measured (V2). The filtrate collected was then filtered through a 1.2 μm pore diameter Versapor Gelman ® filter of 47 mm diameter, also under a pressure of 3 bars. The final viscosity was measured (V3).

All viscosity measurements were made using a Brookfield LVT viscometer fitted with a UL adaptor, at a speed of 6 rpm (7.3 sec$^{-1}$) at 25° C.

The filtrability (F) is expressed as the time required, in minutes and seconds, for the passage of 1,000 ml of solution. If such time exceeded 10 minutes, the value between brackets indicates the volume of solution filtered in ml.

The results of tests 1 to 5 are reported in Table I, in comparison with the initial (control) broth which had not been subjected to the heat treatment.

It will be seen that only the acetyl group content was modified by the treatment, the pyruvic and the glucuronic contents remaining substantially constant.

The results obtained, presented in the form of curves illustrating the changes in the acetic group content (curve 1) and the filtrability (minutes per liter) through a 1.2 μm filter (curve 2) as a function of pH, are shown in FIG. 1.

TABLE I

| Tests | pH | Gluc % | Acet % | Pyr. % | V1 mPa·s | F 5 μm | V2 mPa·s | F 1.2 μm | V3 mPa·s |
| --- | --- | --- | --- | --- | --- | --- | --- | --- | --- |
| Control | | 18.5 | 6.3 | 2.5 | 37 | (260) 10' | 32 | (110) 10' | 30.5 |
| 1 | 0.2 | — | — | — | 44.5 | 2' 50" | 50 | 4' | 51 |
| 2 | 0.5 | 17.8 | 1.65 | 2.5 | 48 | 45" | 41 | 1' 30" | 38.5 |
| 3 | 1 | 18.6 | 3.95 | 2.3 | 37.5 | 35" | 37.5 | 2' 10" | 36 |
| 4 | 1.5 | — | — | — | 39 | (760) 10' | 37 | (950) 10' | 35 |
| 5 | 2 | 18.4 | 5.9 | 2.6 | 38 | (620) 10' | 38 | (400) 10' | 41 |

EXAMPLE 2

A series of tests was carried out as described in Example 1, using the same fermentation broth and varying the temperature and the treatment period as indicated in Table II. Each solution was adjusted to pH 1 using nitric acid.

The results of test 6 to 11 relating to the analysis, the filtrability and the viscosity are reported in Table II.

It will be seen that the acetate content decreased regularly with the treatment period, the pyruvate content remaining substantially constant.

The results obtained are presented in the form of curves illustrating the changes in the acetic group content (curve 1) and the filtrability (minutes/liter) through a 1.2 μm filter (curve 2) as a function of the treatment period at a temperature of 80° C., are shown in FIG. 2.

TABLE II

| Test | Treatment conditions: pH 1 temperature (°C.) period (minutes) | Gluc % | Acet % | Pyr. % | V1 mPa·s | F 5 μm | V2 mPa·s | F 1.2 μm | V3 mPa·s |
| --- | --- | --- | --- | --- | --- | --- | --- | --- | --- |
| Control | — | 18.5 | 6.3 | 2.5 | 37 | (260) 10' | 32 | (110) 10' | 30.5 |
| 6 | 80° C./5' | — | — | — | 38 | (980) 10' | 37.5 | (680) 10' | 33.5 |
| 7 | 100° C./5' | — | — | — | 40 | (840) 10' | 38.5 | (950) 10' | 35 |
| 8 | 80° C./15' | 18.6 | 3.95 | 2.3 | 37.5 | 35" | 37.5 | 2' 10" | 36 |
| 9 | 80° C./30' | 19.1 | 2.54 | 2.34 | 32 | 30" | 33.5 | 1' 25" | 33.5 |
| 10 | 80° C./45' | 18.6 | 1.52 | 2.4 | 30 | (800) | 31 | 7' | 30 |
| 11 | 50° C./45' | | | | 40 | (870) | 39 | (460) | 38.5 |

TABLE II-continued

| Test | Treatment conditions: pH 1 temperature (°C.) period (minutes) | Gluc % | Acet % | Pyr. % | V1 mPa·s | F 5 μm | V2 mPa·s | F 1.2 μm | V3 mPa·s |
|---|---|---|---|---|---|---|---|---|---|
| | | | | | | 10' | | 10' | |

EXAMPLE 3

Another series of tests was carried out using the same broth and, as described in Example 1, varying the temperature. In each test, the solution was adjusted to pH 1 by adding nitric acid, heated for 15 minutes at the temperature indicated in Table III and then treated as in Example 1.

The results obtained are reported in Table III.

It will be seen that the acetyl group content decreased with increasing temperature.

The decrease in pyruvic group content began in the vicinity of 100° C. and was accompanied by a significant decrease in filtrability.

The changes in the acetyl group content (%) and the filtrability (minutes/liter) through a 1.2 μm filter as a function of temperature are illustrated in FIG. 3, curves 1 and 2, respectively.

It will be seen that the treatment with sulfuric acid and with oxalic acid resulted in a significant decreases in the pyruvic group content, which did not occur with nitric acid.

EXAMPLE 5

This example demonstrates the improved filtrability performances obtained from the treatment according to the invention compared to other heat treatments.

The same fermentation broth as that in Example 4 was used. The pH was adjusted either to pH 1 (test 22 according to the invention) or pH 5.5 (test 23 of comparison) using nitric acid, or to pH 8 (tests 24–25 of comparison) using 30% strength sodium hydroxide.

The results of the filtrability tests (Table V) demonstrated that the dilute solutions prepared using the broths treated in accordance with the invention can be easily injected into porous media having a permeability of less than 1 darcy, in contrast to the solutions prepared using broths which were heat-treated under other conditions.

TABLE III

| Tests | T °C. | Gluc % | Acet % | Pyr. % | V1 mPa·s | F 5 μm | V2 mPa·s | F 1.2 μm | V3 mPa·s |
|---|---|---|---|---|---|---|---|---|---|
| Control | | 18.5 | 6.3 | 2.5 | 37 | (260) 10' | 32 | (110) 10' | 30.5 |
| 12 | 50 | — | — | — | 40 | (750) 10' | 39 | (250) 10' | 36 |
| 13 | 60 | — | — | — | 40.5 | (840) 10' | 39.5 | 8' | 36 |
| 14 | 80 | 18.6 | 3.95 | 2.3 | 37.5 | 35" | 37.5 | 2' 10" | 36 |
| 15 | 90 | — | — | — | 43 | 3' | 41.5 | 5' 15" | 41 |
| 16 | 100 | 19.2 | 1.64 | 1 | 37 | (430) 10' | 33 | (240) 10' | 33.5 |

EXAMPLE 4

This example demonstrates that the heat treatment of the xanthan gum under similar conditions of pH, temperature and treatment period did not provide identical results when the pH was adjusted using nitric acid, nor when it was adjusted using a different acid.

The results of the tests 17 (invention) and 18 to 21 (comparisons) obtained from the treatment of a fermentation broth containing 32 g of isopropanolprecipitable dry matter per kg of broth of broth are reported in Table IV. The treatment was carried out according to the method described in Example 1, the pH being adjusted using different acids as indicated in Table IV.

TABLE IV

| Test | Treatment acid | conditions pH - T (°C.) period (min) | Acet % | Pyr. % | V1 mPa·s | F 5 μm | V2 mPa·s | F 1.2 μm | V3 mPa·s |
|---|---|---|---|---|---|---|---|---|---|
| Control | — | — | 6.6 | 3.9 | 34.5 | (510) 10' | 32 | (100) 10' | 27 |
| 17 | HNO$_3$ | pH 1 - 80° C. 15' | 3.3 | 3.8 | 39.5 | 30" | 36.5 | 1' | 35 |
| 18 | H$_2$SO$_4$ | pH 1 - 80° C. 15' | 2.3 | 2.2 | 38.5 | (200) 10' | 37 | (160) 10' | 34 |
| 19 | C$_2$H$_2$O$_4$ | pH 1.3 - 80° C. 15' | 3.9 | 2.2 | 42 | (20) 10' | | | |
| 20 | C$_2$H$_2$O$_4$ | pH 1.3 - 80° C. 30' | | | 39 | (20) 10' | | | |
| 21 | CF$_3$COOH | pH 2 - 80° C. 15' | | | 41 | 5' 30" | 40 | (640) 10' | 40.1 |

TABLE V

| Test | Treatment conditions pH - T (°C.) period = min. | V1 mPa·s | F 5 μm | V2 mPa·s | F 1.2 μm | V3 mPa·s |
|---|---|---|---|---|---|---|
| Control | — | 34.5 | (510) 10' | 32 | (100) 10' | 27 |
| 22 | pH 1 - 90° C. 15' | 39.5 | 30" | 36.5 | 1' | 35 |
| 23 | pH 5.5 - 100° C. 15' | 37 | (750) 10' | 33 | (250) 10' | 26 |
| 24 | pH 8 - 70° C. | 38.5 | (250) | 37 | (80) | 29.5 |

TABLE V-continued

| Test | Treatment conditions pH - T (°C.) period = min. | V1 mPa·s | F 5 μm | V2 mPa·s | F 1.2 μm | V3 mPa·s |
|---|---|---|---|---|---|---|
| 25 | 15' pH 8 - 90° C. 15' | 37.5 | 10' (190) 10' | 38.5 | 10' (150) 10' | 33 |

EXAMPLE 6

A broth obtained upon completion of fermentation was adjusted to pH 1 by adding $HNO_3$ and treated for 15 min. at 85° C. The dry solids were precipitated by adding isopropanol, filtered and dried until a residual moisture content of 8% was obtained.

The filtrability of a 1,000 ppm aqueous solution prepared using the powder collected was evaluated in comparison with that of a solution prepared using powder collected under the same conditions using the same broth, but untreated.

To prepare the 1,000 ppm solution, the powder was dissolved in the brine used in the filtrability test, under stirring provided by a Rayner® centrifugal stirrer rotating at 1,500 rpm.

The results obtained are reported in Table VI. It was observed that the solution obtained from the powder which was recovered from the broth treated according to the invention exhibited no clogging, either through the 5 μm Millipore® filter which simulated the injectability in the vicinity of a well, nor through the 1.2 μm Gelman® filter, apparently demonstrating the absence of microgels which are typically characteristic of this type of preparation.

TABLE VI

| | Treatment | Precipitation | Filtrability 1 g/l solution under 2.7 bars | | Viscosity after filtration (7.3 sec$^{-1}$) |
|---|---|---|---|---|---|
| | | | Millipore 5 μm | Gelman 1.2 μm | |
| Broth obtained upon completion of fermentation | None (control) | Isopropanol | (650) 90'' | 1 l in 2' 50'' | 29.5 mPa·s |
| | pH 1 (HNO$_3$) 80° C. 15 min | Isopropanol | 1 l in 30'' | 1 l in 1' | 28 mPa·s |

EXAMPLE 7

In this example, a scleroglucan broth emanating from a culture of *Sclerotium rolfsii* on a medium containing appropriate carbohydrates and an appropriate nitrogen source was used.

The broth obtained upon completion of fermentation was acidified to pH 1 by adding $HNO_3$ and treated for 15 min. at 80° C. The treated broth was rended using a Waring Blender® mixer, then diluted with demineralized water and neutralized with a strong base. The oxalic acid produced during the fermentation was precipitated by adding a calcium salt and removed with the mycelial debris by filtration.

A 1,000 ppm aqueous solution was prepared using the clarified broth, and using the same brine as in the previous examples for the dilution.

The broth obtained upon completion of fermentation, used as the control for comparison, was prepared in the same manner expect for the heat treatment in the presence of $HNO_3$.

The results for filtrability are reported in Table VII.

TABLE VII

| | Initial viscosity[1] (mPa·s) | Filtrability Millipore 5 μm | Filtrability Gelman 1.2 μm | Final viscosity[1] (mPa·s) |
|---|---|---|---|---|
| Control untreated | 58 | (80) 10' | (120) 10' | 48 |
| Treated broth pH 1 (HNO$_3$) 80° C. 15' | 56 | 1 l in 1' 15'' | 1 l in 1' 30'' | 51 |

[1]Brookfield LVT adaptor UL - 20° C. - 7.3 sec$^{-1}$

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. The product of the process for the preparation of a modified polysaccharide biopolymer, comprising (i) acidifying an aqueous composition of a polysaccharide with nitric acid to a pH from about 2 to 0.1, (ii) heat-treating said acidified composition at a temperature of from about 50° C. to 100° C. for from about 5 to 60 minutes, and (iii) cooling said heat-treated composition and adjusting the pH thereof to a value of from about 5 to 7.

2. The modified polysaccharide biopolymer as defined by claim 1, further comprising a biocide, enzyme, or admixture thereof.

3. In a method for the secondary or tertiary recovery of subterranean oil deposits by injecting a viscosity-enhancing additive therein, the improvement which comprising utilizing as the viscosity-enhancing additive therefor, an aqueous composition of the deacetylated polysaccharide biopolymer as defined by claim 1.

4. A modified polysaccharide biopolymer as defined by claim 1 having from 5% to 80% of the acetyl groups of a native, unmodified polysaccharide.

5. A modified polysaccharide biopolymer as defined by claim 1 comprising between 1.52% to 3.95% acetyl groups.

6. The modified polysaccharide biopolymer as defined by claim 4, wherein the content of pyruvic groups present in the modified polysaccharide biopolymer varies between 0% to 8% of the pyruvic groups in a native unmodified polysaccharide.

7. The modified polysaccharide biopolymer as defined by claim 5, wherein the content of pyruvic groups present in the modified polysaccharide biopolymer varies between 0% to 8% of the pyruvic groups in a native unmodified polysaccharide.

8. The modified polysaccharide biopolymer as defined by claim 1, wherein said modified polysaccharide biopolymer is derived from Xanthan gum.

9. In a method for the secondary or tertiary recovery of subterranean oil deposits by injecting a viscosity-enhancing additive therein, the improvement which comprises utilizing as the viscosity-enhancing additive therefor, an aqueous composition of the deacetylated polysaccharide biopolymer as defined by claim 7.

10. In a method for the secondary or tertiary recovery of subterranean oil deposits by injecting a viscosity-enhancing additive therein, the improvement which comprises utilizing as the viscosity-enhancing additive therefor, an aqueous composition of the deacetylated polysaccharide biopolymer as defined by claim 6.

* * * * *